(12) United States Patent
Wietkemper et al.

(10) Patent No.: US 7,944,452 B1
(45) Date of Patent: *May 17, 2011

(54) METHODS AND SYSTEMS FOR REUSING MEMORY ADDRESSES IN A GRAPHICS SYSTEM

(75) Inventors: Adam Clark Wietkemper, Holly Springs, NC (US); Steven E. Molnar, Chapel Hill, NC (US); Mark J. French, Raleigh, NC (US); Cass W. Everitt, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 978 days.

This patent is subject to a terminal disclaimer.

(21) Appl. No.: 11/552,093

(22) Filed: Oct. 23, 2006

(51) Int. Cl.
*G06F 12/02* (2006.01)
*G06F 12/10* (2006.01)
*G06F 12/06* (2006.01)

(52) U.S. Cl. ......... 345/566; 345/567; 345/568; 345/572
(58) Field of Classification Search .......... 345/564–568, 345/572–574
See application file for complete search history.

(56) References Cited

U.S. PATENT DOCUMENTS

| | | | | |
|---|---|---|---|---|
| 5,170,468 A * | 12/1992 | Shah et al. | | 345/537 |
| 6,628,294 B1 * | 9/2003 | Sadowsky et al. | | 345/568 |
| 6,992,679 B2 * | 1/2006 | Tillery et al. | | 345/568 |
| 2001/0042184 A1 | 11/2001 | Sethi | | |
| 2005/0050297 A1 * | 3/2005 | Essick et al. | | 711/207 |
| 2008/0055328 A1 * | 3/2008 | Shin et al. | | 345/566 |

OTHER PUBLICATIONS

Office Action dated Nov. 19, 2010 for U.S. Appl. No. 11/953,812.

* cited by examiner

*Primary Examiner* — Hau H Nguyen
(74) *Attorney, Agent, or Firm* — Patterson & Sheridan, LLP

(57) ABSTRACT

Methods and systems for reusing memory addresses in a graphics system are disclosed, so that instances of address translation hardware can be reduced. One embodiment of the present invention sets forth a method, which includes mapping a footprint in screen space to a group of contiguous physical memory locations in a memory system, determining a first physical memory address for a first transaction associated with the footprint, wherein the first physical memory address is within the group of contiguous physical memory locations, determining a second transaction that is also associated with the footprint, determining a set of least significant bits associated with the second transaction, and combining a portion of the first physical memory address with the set of least significant bits associated with the second transaction to generate a second physical memory address for the second transaction, thereby avoiding a second full address translation.

20 Claims, 7 Drawing Sheets

US 7,944,452 B1

METHODS AND SYSTEMS FOR REUSING MEMORY ADDRESSES IN A GRAPHICS SYSTEM

BACKGROUND OF THE INVENTION

1. Field of the Invention

Embodiments of the present invention relate generally to video processing and more specifically to reusing memory addresses in a graphics system.

2. Description of the Related Art

Unless otherwise indicated herein, the approaches described in this section are not prior art to the claims in this application and are not admitted to be prior art by inclusion in this section.

For the ease of memory management and the sharing of limited physical memory resources, some graphics systems utilize a virtual addressing scheme for memory accesses. The virtual addressing scheme can be costly, because it necessarily involves the process of mapping a virtual memory address to a physical memory address, which is commonly referred to as "address translation." One technique to reduce, but not to eliminate entirely, the address translation time is to cache certain virtual memory address and physical memory address information in a special buffer, the translation-lookaside buffer ("TLB"). Specifically, one type of TLB entry contains a virtual page number that has been recently accessed for translation as a tag and a physical page number as part of the payload data. As an illustration, FIG. 1 is a conceptual diagram of a TLB, such as TLB 100. TLB 100 has a number of entries, such as entry 102. Each entry includes multiple fields, two of which are the tag field and the physical page number field, as shown in FIG. 1. Thus, if virtual page number 106 of a requested virtual memory address, such as 104, matches one of the tags in TLB 100, such as 110, then physical page number 112 together with page offset 108 formulates physical memory address 114.

TLB 100 is an expensive hardware resource, requiring a random access memory (RAM), often of significant size, associative lookup logic for matching requests against cached RAM entries, and usually nontrivial logic for handling hits to pages that previously missed and are still being fetched. In a graphics system with many clients, multiple address translations may need to be performed simultaneously, potentially requiring multiple TLBs.

As the foregoing illustrates, what is needed in the art is a way to minimize the instances of a TLB in a graphics system to reduce hardware cost, while either maintaining or improving overall throughput.

SUMMARY OF THE INVENTION

Methods and systems for reusing memory addresses in a graphics system are disclosed. One embodiment of the present invention sets forth a method, which includes mapping a footprint to a group of contiguous physical memory locations in a memory system, determining a first physical memory address for a first transaction associated with the footprint, wherein the first physical memory address is within the group of contiguous physical memory locations, determining a second transaction that is also associated with the footprint, determining a set of least significant bits associated with the second transaction, and combining a portion of the first physical memory address with the set of least significant bits associated with the second transaction to generate a second physical memory address for the second transaction.

One advantage of the disclosed methods and systems is that they reduce instances of address translation hardware in a graphics system while still improving its overall throughput.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Methods and systems for reusing addresses in a graphics system are described. In the following description, for the purposes of explanation, numerous specific details are set forth in order to provide a thorough understanding of the present invention. It will be apparent, however, to one skilled in the art that the present invention may be practiced without these specific details.

Throughout this disclosure, one operation is said to "overlap" or to perform "in parallel" with another operation, when at least some portions of the two operations are performed at the same time. To render a computer graphics image, a geometric primitive, such as a triangle, is transformed into a screen-aligned coordinate system, referred to as "screen space." "Geometric primitive" and "primitive" are also used interchangeably. Each geometric primitive can be mapped into a discrete and finite grid of "tiles" in memory, each of which contains a discrete and finite grid of "frame buffer pixels," which are used interchangeably with "pixels." Unless otherwise indicated, each screen space pixel corresponds to a frame buffer pixel in a one-to-one relationship in this disclosure. The depth value and stencil data associated with a pixel are used to determine pixel visibility. The combination of depth value and stencil data is referred to herein as "Z-data." Each pixel can be further divided into a discrete and finite grid of "subpixels," which are used interchangeably with "samples."

Figure 2A:
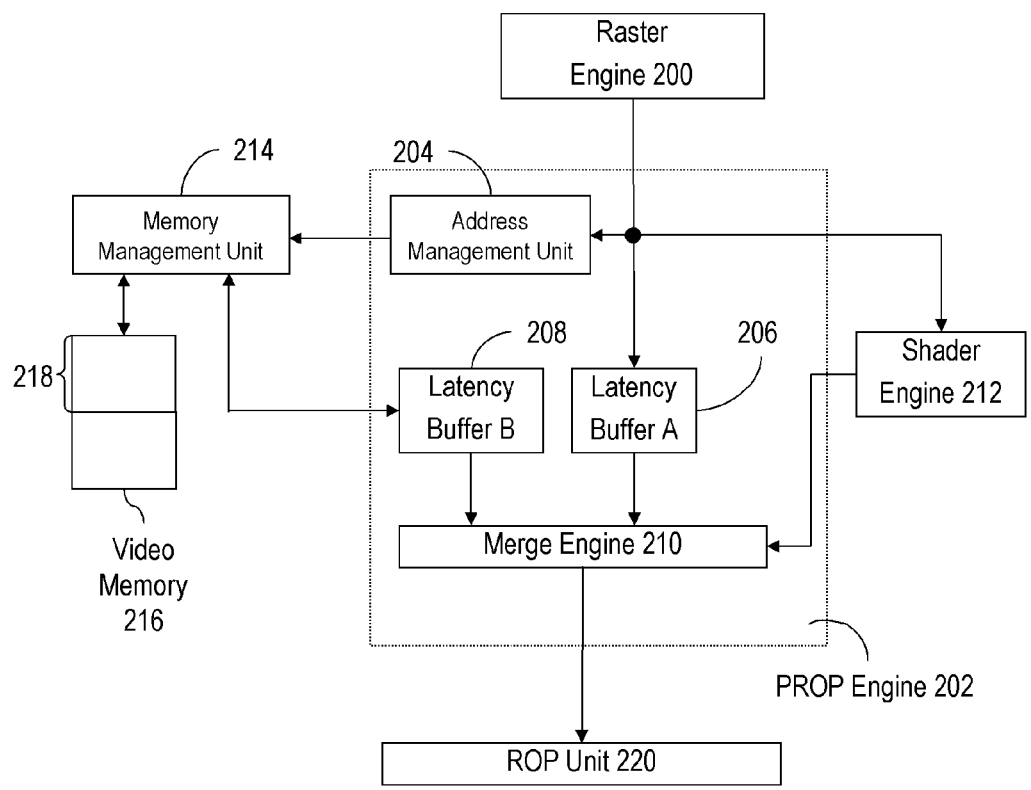
FIG. 2A is a conceptual diagrams of a pre-raster operations engine that facilitates the reuse of previously translated addressing information, according to one embodiment of the present invention.

One embodiment of a pre-raster operations ("PROP") engine improves throughput by identifying situations in which the full address translation operation may not need to be carried out. One such situation arises if an incoming packet of work refers to a set of screen coordinates that is within a certain footprint on the screen. This "packet of work" generally contains the screen coordinates and the coverage mask information relating to a tile and is used at the address translation stage of a graphics pipeline. FIG. 2A is a conceptual diagram of a PROP engine, such as 202, that facilitates the reuse of previously translated addressing information to avoid performing a complete address translation, according to one embodiment of the present invention. As shown, PROP engine 202 includes at least address management unit 204, latency buffer A 206, latency buffer B 208, and merge engine 210. PROP engine 202 is also at least coupled to raster engine 200, shader engine 212, memory management unit 214, and raster operations ("ROP") unit 220.

Raster engine 200 traverses and decomposes the geometric primitives resulting from the setup stage of a graphics pipeline into fragments, corresponding to screen space pixels that are at least partially covered by the geometric primitives. For each sample that is covered by the geometric primitive, raster engine 200 asserts a bit in a coverage mask to reflect the state of coverage. In addition to the coverage mask, one embodiment of raster engine 200 also maintains the 2-dimensional coordinates in the screen space, (x, y), for the upper most left sample in a tile. Raster engine 200 then sends a transaction request corresponding to the aforementioned (x, y) screen coordinates and the coverage mask to PROP engine 202 for further processing.

Figure 1:
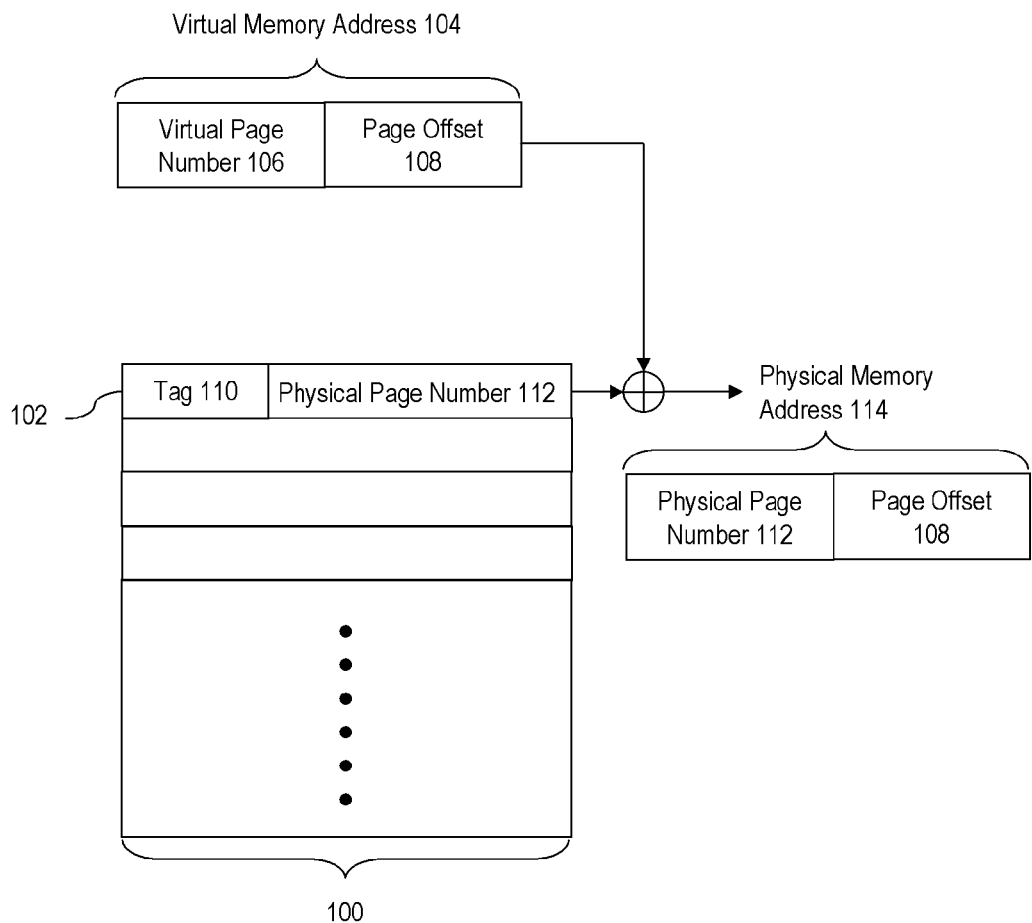
FIG. 1 is a conceptual diagram of performing address translation using a translation-lookaside buffer.

Moreover, in one implementation, the aforementioned tiles that are within a certain footprint on a target display screen are stored in contiguous memory locations for access efficiency. More specifically, in a system supporting virtual addresses, such as the system shown in FIG. 2, the (x, y) screen coordinates of the transaction request are translated to a virtual address. This can be accomplished via address mapping arithmetic familiar to ones skilled in the art. The virtual address is also mapped to a physical address. As discussed above, this mapping process requires determining a virtual page number and the address within the page, also referred to as page offset 108 in FIG. 1. The virtual page number is replaced with a physical page number, such as physical page number 112, as determined by a virtual memory page table, such as TLB 100. The physical page number is then concatenated with the address within the page that is carried forward to form the physical address, such as physical memory address 114. If two tiles, a first and a second tile, are within the same footprint, the physical addresses derived from the tiles according to the process described above would then be associated with the same group of contiguous memory locations, also referred to as a "GOB" throughout this disclosure. Each physical page may include multiple GOBs, and each GOB is uniquely identified by a GOB number. In one embodiment, when the two tiles are mapped to the same GOB, some parts of a first physical address translated from the first tile can be reused to determine a second physical address corresponding to the second tile without having to pass by a TLB for determining the second physical address. Subsequent paragraphs will further detail various schemes for determining this second physical address.

Figure 2B:
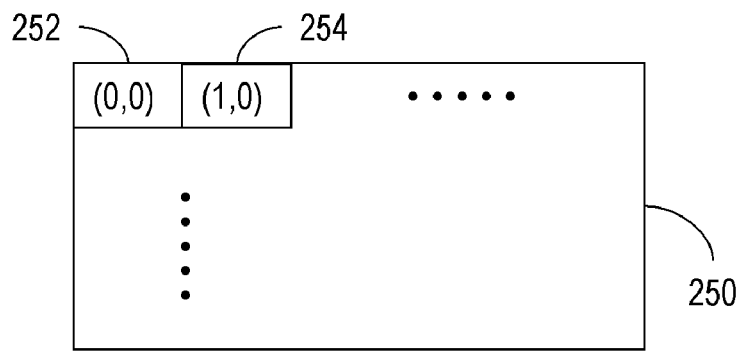
FIG. 2B is a conceptual diagram illustrating one way to convert from the screen coordinates within a rectangular screen region to an offset within a GOB.
Figure 2B:
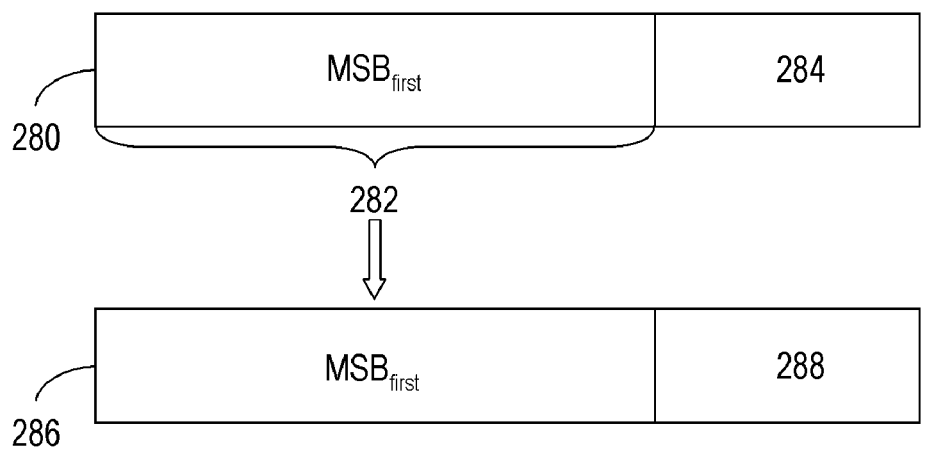

FIG. 2B is a conceptual diagram illustrating the aforementioned conversion from the screen coordinates within a rectangular footprint, screen region 250, to an address within the GOB corresponding to screen region 250. Suppose the (x, y) screen coordinates associated with a first tile, 252, have been translated to a first physical address, 280; and first tile 252 and a second tile, 254, both reside in screen region 250. To determine a second physical address, 286, for the (x, y) screen coordinates associated with second tile 254, the content in a field 282 of first physical address 280 is reused. Here, the content is denoted as $MSB_{first}$, which in one implementation represents a specific GOB within a particular physical page corresponding to screen region 250. In addition, the address within this GOB needs to be determined and placed in a field 288. Furthermore, a GOB may be aligned to certain boundaries. For example, suppose screen region 250 is a 16-pixel by 4-pixel footprint, with each pixel having 4 bytes. Then screen region 250 is mapped to a 256-byte GOB, which can be aligned to a 256-byte boundary. In other words, first physical address 280 would start at an address that is of a multiple of 256 bytes. It should be apparent to one with ordinary skill in the art to recognize that the above examples are for illustration purposes only and shall not be construed to limit the scope of the claimed invention.

Figure 3:
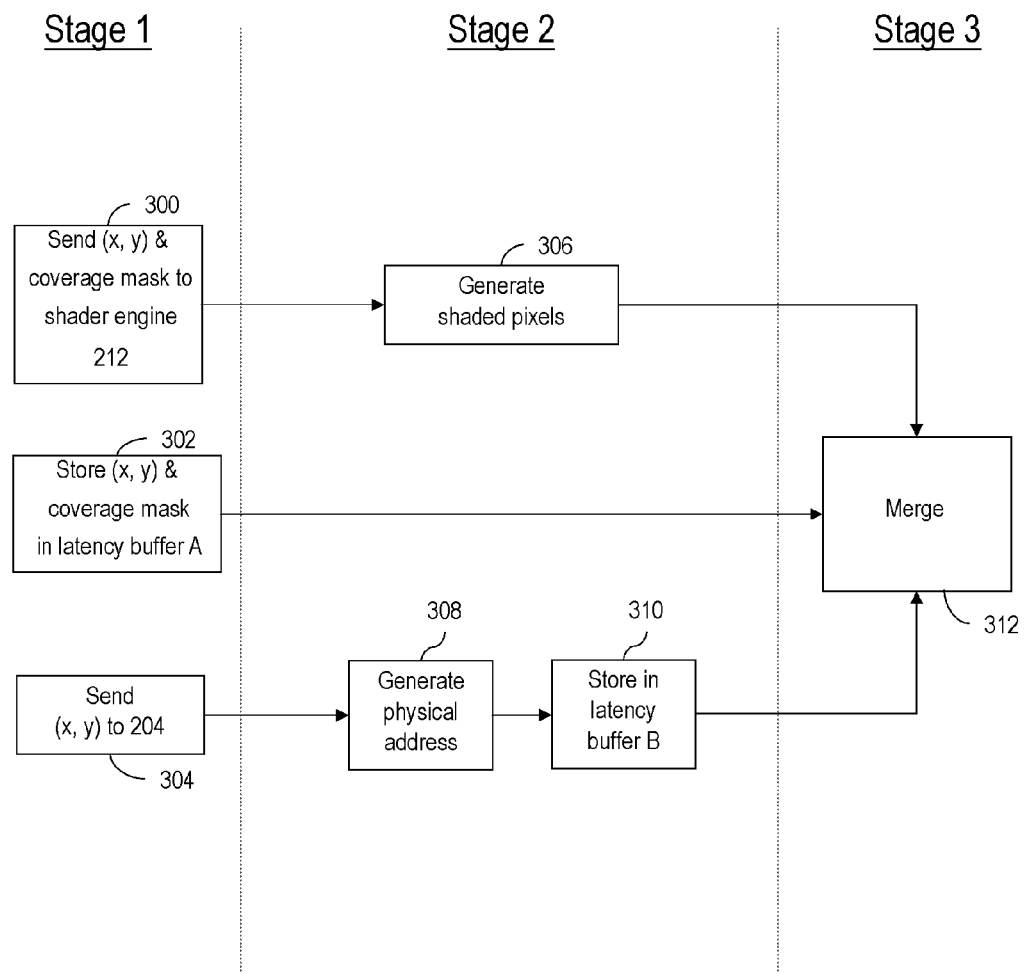
FIG. 3 illustrates a process that the pre-raster operations engine of FIG. 2A follows after having received data from raster engine, according to one embodiment of the present invention.

PROP engine 202 shown in FIG. 2A generates one or more packets of work based on the incoming transaction requests and follows a process shown in FIG. 3. Each packet of work is associated with a tile, and each GOB includes two or more tiles. In stage 1 of its operations, PROP engine 202 directs both the (x, y) coordinates and the coverage mask in a packet of work to shader engine 212 in step 300. In parallel, PROP engine 202 also directs the (x, y) coordinates in the packet of work to address management unit 204 of FIG. 2A in step 304. Also still in parallel, PROP engine 202 optionally stores the (x, y) coordinates and the coverage mask in latency buffer A 206 in step 302. Alternatively, PROP engine 202 does not include latency buffer A 206 and instead receives the (x, y) coordinates and the coverage mask from shader engine 212.

In stage 2, one embodiment of shader engine 212 computes, without limitation, the colors, textures, and Z-data for the tile associated with the packet of work, as determined by the programming of shader engine 212. These processes are shown as step 306 of FIG. 3. In parallel with the operations of shader engine 212, address management unit 204 and memory management unit 214, together, generate a physical address in step 308 and store it in latency buffer B 208 in step 310. Two steps are typically involved to derive a physical address: one is utilizing a mapping function to map the two-dimensional coordinates on the screen to a virtual address, and the other is translating this virtual address to a physical address. A full address translation operation generally involves a TLB lookup as discussed above to obtain the physical page number. In addition, this operation may also include translating a GOB number from the virtual address space to the physical address space. Subsequent paragraphs will further detail the operations of address management unit 204.

The physical address discussed above could represent a location in a color buffer where a color value of the pixel is to be stored or a location in a depth buffer where Z-data of the pixel is to be stored. In one implementation, the color buffer and the depth buffers both reside in frame buffer 218 of FIG. 2A, which is part of video memory 216.

In stage 3, merge engine 210 of FIG. 2A merges the data from shader engine 212, latency buffer A 206, and latency buffer B 208 in step 310. In one implementation, merge engine 210 waits until all data is received before distributing the received data to other engines in the graphics pipeline for processing, such as ROP unit 220.

Figure 4:
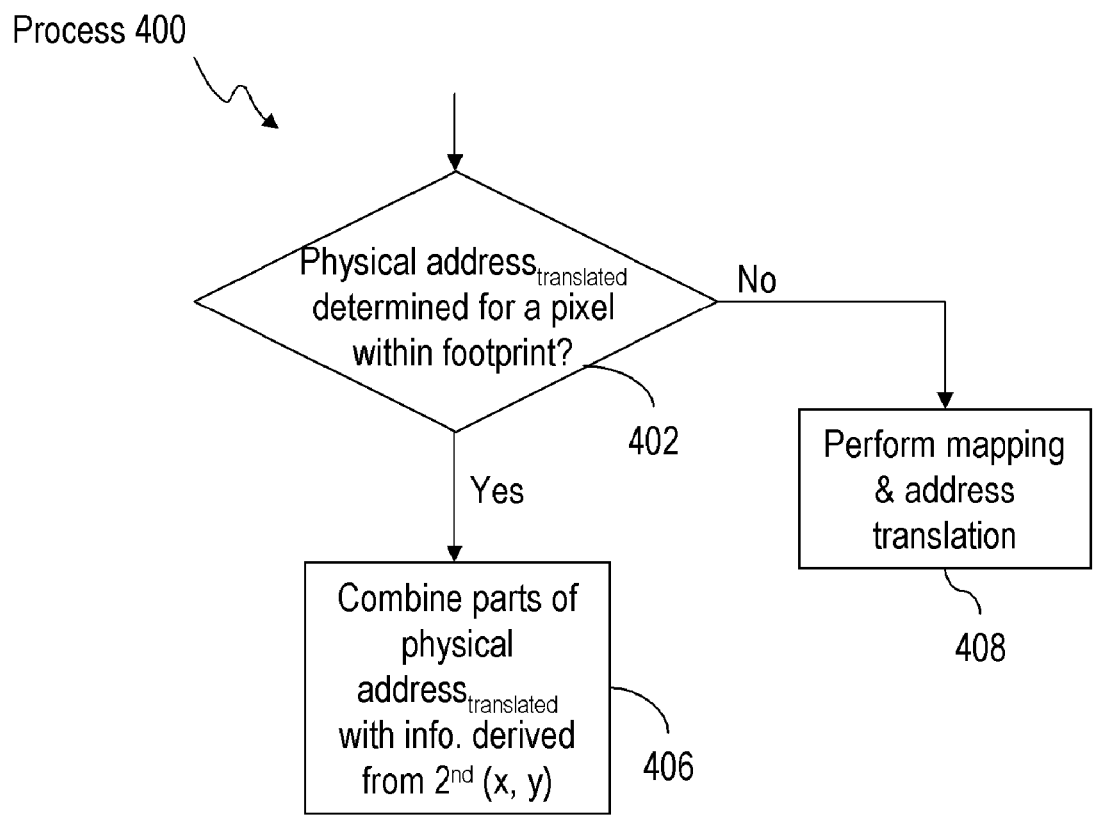
FIG. 4 illustrates one process that the address management unit of FIG. 2A follows to generate a physical address, according to one embodiment of the present invention.

FIG. 4 illustrates one process, process 400, that address management unit 204 shown in FIG. 2A follows to generate the physical address of a pixel. Specifically, in step 402, address management unit 204 checks whether the physical address of the pixel associated with a first set of (x, y) screen coordinates within a particular footprint on the screen has been determined. If so, then certain parts of this physical address, the physical address$_{translated}$, such as physical page number and GOB number, can be reused to formulate the physical address corresponding to a second set of (x, y) coordinates that are also within the same footprint, the physical address(x, y), in step 406. Thus, performing step 406 does not require an additional virtual address to physical address translation and does not need to access a TLB. Subsequent paragraphs will further discuss a number of approaches to combine the information derived from the second set of (x, y) screen coordinates with the physical address$_{translated}$. Furthermore, although process 400 is mainly described with pixels within a single footprint, it should be apparent to a person skilled in the art to implement a process capable of tracking multiple footprints in screen space along with the associated physical addresses$_{translated}$ for each of such footprints.

Figure 5:
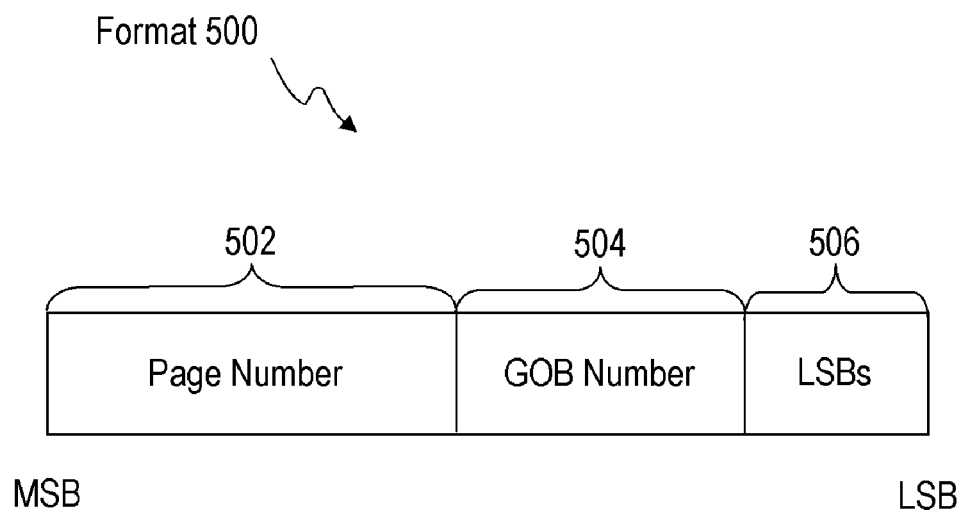
FIG. 5 illustrates one physical address format, according to one embodiment of the present invention.

FIG. 5 illustrates one physical address format, format 500, which includes page number field 502, GOB number field 504, and least significant bits ("LSBs") field 506. In particular, page number field 502 includes information referring to a particular page in memory; GOB number field 504 includes information referring to a particular GOB within that page; and LSBs field 506 includes information referring to a particular byte within that GOB. In one implementation, the physical addresses for the pixels within a footprint on the screen share the common page number and the GOB number. The LSBs associated with each pixel indicates where within the GOB the pixel is to be stored. In addition, the LSBs are identical in both the physical address and the virtual address. Therefore, instead of performing the full address translation as discussed above to derive the physical address$_{(x, y)}$, if the physical address$_{translated}$ is available as determined in step 402, then address management unit 204 shown in FIG. 2A in step 406 reuses the common page number in field 502 and the GOB number in field 504 of the physical address$_{translated}$ by combining them with the LSBs derived from the relative location of the second set of (x, y) coordinates within the footprint on the screen as detailed above.

On the other hand, according to FIG. 4, if the first set of (x, y) coordinates associated with the pixel within the footprint have not been mapped and translated to a physical address as determined in step 402 of process 400, then address management unit 204 together with memory management unit 214 as shown in FIG. 2A map the screen coordinates to the virtual address$_{(x, y)}$ and translate this virtual address$_{(x, y)}$ to the physical address$_{(x, y)}$ in step 408. For the subsequent packets of work that refer to other screen coordinates, which are within the aforementioned footprint on the screen, this resulting physical address$_{(x, y)}$ is considered as the physical address$_{translated}$. It is worth noting that if address translation is performed in step 408, accesses are made to the TLB. Also, suppose step 408 is performed upon receipt of a request to perform an address translation for the first set of (x, y) screen coordinates at time old, and step 402 is performed on the second set of (x, y) screen coordinates at a subsequent time, time new. The determination made at step 402 may occur prior to the completion of step 408. In short, the decision regarding whether to bypass accessing the TLB can be made before a request to perform an address translation is completed.

Furthermore, address management unit 204 as shown in FIG. 2A processes the screen coordinates that are referred to in successive packets of work in a number of ways. For discussion purposes, suppose the first of a set of two successive packets of work in time contains a first (x, y) coordinates, which may correspond to a first virtual address or a first physical address; and the second of the set contains a second (x, y) coordinates, which may also correspond to a second virtual address or a second physical address. In one implementation, address management unit 204 maps the first (x, y) coordinates to the first virtual address, translates the first virtual address to the first physical address, and stores the first physical address. This first physical address is also referred to as the physical address$_{translated}$ shown in FIG. 4. If the second virtual address refers to a memory location that is within the same GOB in the same page as the first virtual address, then certain parts of the address translation, such as the page number and the GOB number, which has been performed for the first virtual address, can be reused to determine the physical address corresponding to the second virtual address. Referring back to FIG. 4, the most significant bits (the "MSBs") of the two virtual addresses, for example the page number and the GOB number, are compared to determine whether they map to the same GOB. If they do, then in step 406, the MSBs of the stored physical address$_{translated}$ are combined with the LSBs of the second virtual address.

In another embodiment, address management unit 204 again maps the first (x, y) coordinates to the first virtual address, translates the first virtual address to the first physical address, and stores the first physical address, which is also referred to as the physical address$_{translated}$. After having determined the second (x, y) screen coordinates and the first (x, y) screen coordinates map to the same GOB by comparing the MSBs of the two screen coordinates, the LSBs of the second (x, y) screen coordinates are translated to a physical address through a simple mapping process. Then in step 406, the MSBs of the stored physical address$_{translated}$ are combined with this translated physical address.

In yet another embodiment, address management unit 204 splits the first virtual address into the MSBs segment (e.g., the page number and the GOB number) and the LSBs segment. Then address management unit 204 zeroes out the LSBs of the first virtual address to obtain the virtual address of an anchor point. This virtual address of the anchor point is translated into a physical address, which is referred to as the physical address of the anchor point. Address management unit 204 stores this physical address of the anchor point, which again is also referred to as the physical address$_{translated}$ of FIG. 4. After having determined that the second virtual address and the first virtual address map to the same GOB by comparing the MSBs of the two virtual addresses, then in step 406, the LSBs of the second virtual address are combined with the stored physical address$_{translated}$.

In still another embodiment, address management unit 204 first splits the first (x, y) screen coordinates into the MSBs segment and the LSBs segment. Then address management unit 204 zeroes out the LSBs of the first (x, y) screen coordinates, maps these modified (x, y) screen coordinates to a virtual address, and translates this virtual address to a physical address. This physical address is the physical address of an anchor point. Address management unit 204 stores the physical address of the anchor point, which is also referred to as the physical address$_{translated}$ of FIG. 4. After having determined the second (x, y) screen coordinates and the first (x, y) screen coordinates map to the same GOB by comparing the MSBs of the two screen coordinates, then in step 406, the LSBs of the second (x, y) screen coordinates are translated to a physical address, which is then combined with the stored physical address$_{translated}$.

As has been demonstrated, all of the illustrated embodiments of address management unit 204 reuse certain parts of the results from a full address translation within each GOB and as a result reduce the number of full address translations that must be performed, allowing increased throughput without requiring additional hardware, such as instances of a TLB.

To further enhance the performance of the overall graphics pipeline, one approach utilizes the embodiments described above to process two streams of requests, one for color and the other for Z-data, in parallel that are referred to by the packets of work. More specifically, if pairs of adjacent Z requests access the same GOB, then one full address translation is performed for the Z stream every two clock cycles. In parallel, if pairs of adjacent color requests access the same GOB, then one full address translation is performed for the color stream every two clock cycles. Each stream thus could achieve a throughput of one transaction per clock. A single address translation for the GOB is sufficient to satisfy the both streams.

Figure 6:
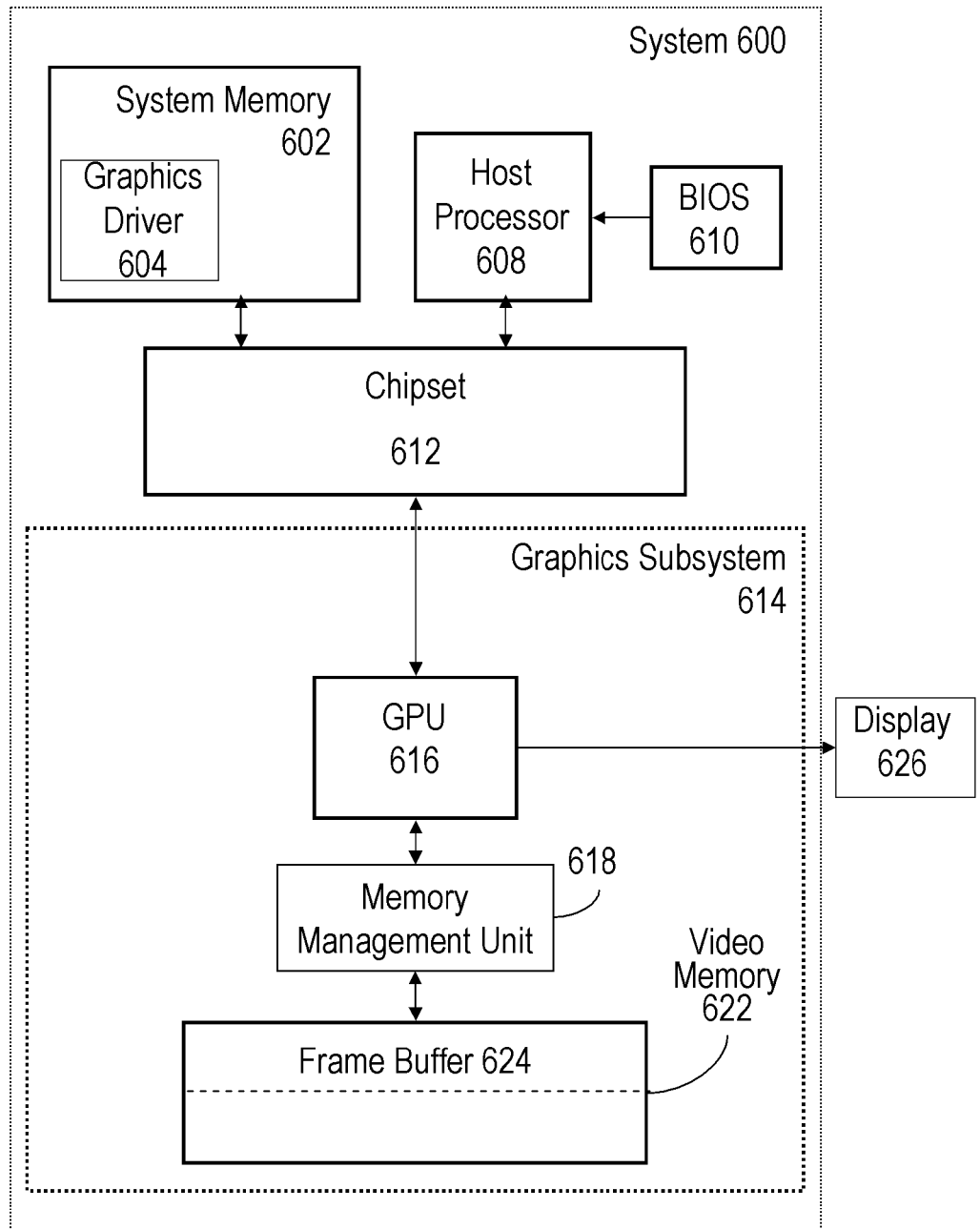
FIG. 6 is a block diagram of a system configured to implement one or more aspects of the present invention.

FIG. 6 is a block diagram of a system configured to implement one or more aspects of the present invention. Without limitation, system 600 may be a desktop computer, server, laptop computer, palm-sized computer, tablet computer, game console, cellular telephone, hand-held device, mobile device, computer based simulator, or the like. System 600 includes host processor 608, BIOS 610, system memory 602, and chipset 612 that is directly coupled to graphics subsystem 614. BIOS 610 is a program stored in read only memory ("ROM") or flash memory that is run at bootup. Graphics subsystem 614 includes a single GPU, GPU 16.

A device driver, graphics driver 604, stored within system memory 602, configures GPU 616 to share the graphics processing workload performed by system 600 and communicate with applications that are executed by host processor 608. In one embodiment, graphics driver 604 generates and places a stream of commands in a "push buffer." When the commands are executed, certain tasks, which are defined by the commands, are carried out by the GPU.

In some embodiments of system 600, chipset 612 provides interfaces to host processor 608, memory devices, storage devices, graphics devices, input/output ("I/O") devices, media playback devices, network devices, and the like. It should be apparent to a person skilled in the art to implement chipset 612 in two or more discrete devices, each of which supporting a distinct set of interfaces.

GPU 616 is responsible for outputting image data to display 626. Display 626 may include one or more display devices, such as, without limitation, a cathode ray tube ("CRT"), liquid crystal display ("LCD"), or the like. GPU 616 is also coupled to memory management unit 618 and video memory 622, each of which in one embodiment corresponds to memory manage unit 214 and video memory 216 as shown in FIG. 2A, respectively. Video memory 622 may be used to store image data and program instructions. In one embodiment, a portion of video memory 622 is allocated to store image data for display, frame buffer 624.

Upon execution of the commands in the aforementioned push buffer, one embodiment of GPU 616 performs the functions of the various engines as shown in FIG. 2A and follows the process as shown in FIG. 4 and discussed above. It should be apparent to one of ordinary skill in the art to include two or more GPUs in graphics subsystems 614 or include two or more graphics subsystems 614 in a system. Moreover, although graphics subsystem 614 of systems 600 is shown to provide certain graphics processing capabilities, alternative embodiments of graphics subsystems 614 may process additional types of data, such as audio data, multimedia data, or the like.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A method for deriving a physical memory address for a transaction associated with a footprint on a display screen, the method comprising:
    mapping the footprint to a group of contiguous physical memory locations in a memory system;
    determining a first physical memory address for a first transaction associated with the footprint, wherein the first physical memory address is within the group of contiguous physical memory locations;
    determining a second transaction that is also associated with the footprint;
    determining a set of least significant bits associated with the second transaction; and
    combining a portion of the first physical memory address with the set of least significant bits associated with the second transaction to generate a second physical memory address for the second transaction.

2. The method of claim 1, wherein if a set of screen coordinates associated with the second transaction are within the footprint, then the set of screen coordinates maps to one of the group of contiguous memory locations.

3. The method of claim 1, wherein if the most significant bits of a first set of screen coordinates associated with the first transaction equal to the most significant bits of a second set of screen coordinates associated with the second transaction, then the first set of screen coordinates and the second set of screen coordinates both map to the group of contiguous memory locations.

4. The method of claim 3, further comprising reusing the most significant bits of the first physical address to generate the second physical address.

5. The method of claim 1, wherein if the most significant bits of a first virtual address associated with the first transaction equal to the most significant bits of a second virtual address associated with the second transaction, then the first virtual address and the second virtual address both map to the group of contiguous memory locations.

6. The method of claim 5, further comprising reusing the most significant bits of the first physical address to generate the second physical address.

7. The method of claim 6, further comprising combining the most significant bits of the first physical address and the least significant bits of the second virtual address to generate the second physical address.

8. The method of claim 1, further comprising deciding to proceed with the combining step before a request to generate the first physical address is completed.

9. The method of claim 1, further comprising:
    organizing a first stream of the first transaction and the second transaction for color data to map to a first group of contiguous memory locations and also a second stream of the first transaction and the second transaction for Z-data to map to a second group of contiguous memory locations; and
    operating on the first stream and the second stream in parallel.

10. The method of claim 1, further comprising tracking a plurality of the footprints and the first physical memory address associated with each of the plurality of the footprints.

11. A computing device configured to derive a physical memory address for a transaction associated with a footprint on a display screen, the computing device comprising:

a graphics processing unit, including an address management unit, and a memory system, coupled to the address management unit, wherein the address management unit is configured to:

map the footprint to a group of contiguous physical memory locations in the memory system;

determine a first physical memory address for a first transaction associated with the footprint, wherein the first physical memory address is within the group of contiguous physical memory locations;

determine a second transaction that is also associated with the footprint;

determine a set of least significant bits associated with the second transaction; and combine a portion of the first physical memory address with the set of least significant bits associated with the second transaction to generate a second physical memory address for the second transaction.

12. The computing device of claim 11, wherein if a set of screen coordinates associated with the second transaction are within the footprint, then the set of screen coordinates maps to one of the group of contiguous memory locations.

13. The computing device of claim 11, wherein if the most significant bits of a first set of screen coordinates associated with the first transaction equal the most significant bits of a second set of screen coordinates associated with the second transaction, then the first set of screen coordinates and the second set of screen coordinates both map to the group of contiguous memory locations.

14. The computing device of claim 13, wherein the address management unit is further configured to reuse the most significant bits of the first physical address to generate the second physical address.

15. The computing device of claim 11, wherein if the most significant bits of a first virtual address associated with the first transaction equal the most significant bits of a second virtual address associated with the second transaction, then the first virtual address and the second virtual address both map to the group of contiguous memory locations.

16. The computing device of claim 15, wherein the address management unit is further configured to reuse the most significant bits of the first physical address to generate the second physical address.

17. The computing device of claim 16, wherein the address management unit is further configured to combine the most significant bits of the first physical address and the least significant bits of the second virtual address to generate the second physical address.

18. The computing device of claim 11, wherein the address management unit is further configured to decide to proceed with combining the portion of the first physical memory address with the set of least significant bits before a request to generate the first physical address is completed.

19. The computing device of claim 11, wherein the graphics processing unit is configured to:

organize a first stream of the first transaction and the second transaction for color data to map to a first group of contiguous memory locations and also a second stream of the first transaction and the second transaction for Z-data to map to a second group of contiguous memory locations; and operate on the first stream and the second stream in parallel.

20. The computing device of claim 11, wherein the address management unit is further configured to track a plurality of the footprints and the first physical memory address associated with each of the plurality of the footprints.

* * * * *